United States Patent [19]

Petrov et al.

[11] Patent Number: 4,875,204
[45] Date of Patent: Oct. 17, 1989

[54] METHOD OF ERASING INFORMATION

[75] Inventors: Vyacheslav V. Petrov, Kiev; Nikolai V. Gorshkov, Moscow; Alexandr A. Antonov, Kiev; Alexandr P. Tokar, Kiev; Andrei A. Krjuchin, Kiev; Semen M. Shanoilo, Kiev, all of U.S.S.R.

[73] Assignee: Institut Problem Modelirovania V Energetike Akademii Nauk Ukrainskoi SSR, Kiev, U.S.S.R.

[21] Appl. No.: 134,786
[22] PCT Filed: Feb. 5, 1987
[86] PCT No.: PCT/SU87/00020
§ 371 Date: Oct. 6, 1987
§ 102(e) Date: Oct. 6, 1987
[87] PCT Pub. No.: WO87/04842
PCT Pub. Date: Aug. 13, 1987

[30] Foreign Application Priority Data

Feb. 7, 1986 [SU] U.S.S.R. ............................ 3134138

[51] Int. Cl.$^4$ .................................................. G11B 7/00
[52] U.S. Cl. ...................................... 369/100; 369/275
[58] Field of Search ............... 369/100, 275, 179, 288

[56] References Cited

U.S. PATENT DOCUMENTS

| | | | |
|---|---|---|---|
| 4,074,282 | 2/1978 | Balas Jr. et al. | 346/135 |
| 4,331,966 | 5/1982 | Moe | 346/137 |
| 4,403,318 | 9/1983 | Nagashima et al. | 369/100 |
| 4,519,061 | 5/1985 | Dahneke et al. | 369/109 |
| 4,719,615 | 1/1988 | Feyrer et al. | 369/284 |

FOREIGN PATENT DOCUMENTS 3203599 of 1982 Fed. Rep. of Germany.
2482756 of 1981 France.

*Primary Examiner*—Frank Gonzalez
*Attorney, Agent, or Firm*—Lilling & Greenspan

[57] ABSTRACT

A method of erasing information recorded on an optical carrier which includes an air-tight space having a recording layer on the inner surface thereof, fills the air-tight space with a gas inert in relation to the material of the recording layer and to the material of the carrier under a pressure selected from a range from 10 to $10^3$ kPa, and, after the heating process is discontinued, the recording layer is regenerated.

2 Claims, 1 Drawing Sheet

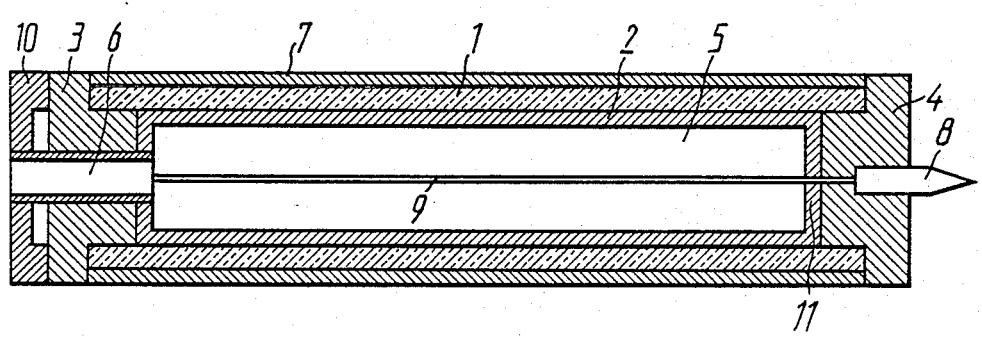

METHOD OF ERASING INFORMATION

BACKGROUND OF THE INVENTION

1. Field of the Invention

This invention relates to information storage and processing and, particularly, is concerned with methods of erasing information.

2. Description of the Prior Art

Known in the art is a method of erasing information in optical storage devices, wherein portions of an optical information carrier, on which information had been recorded, are exposed to a light beam so that they are reversibly converted into a state having initial optical properties. Such exposure of the optical carrier leads to changes in the degree of crystallization of the recording layer of the carrier, (FR, B, 2, 482 756).

This method is deficient in that it is too lengthy since the optical carrier has to be heated very slowly and the temperature has to be controlled precisely after heating. The method is not efficient and the reliability of repeated recordings is too low because recording and erasing cycles adversely affect the structure of the recording layer, its thickness becomes irregular.

Also known in the art is a method for erasing information recorded on an optical carrier having a recording layer, (U.S. Pat. No. 4 403 318) wherein the optical carrier is subjected to external exposure erasing recorded information, e.g. by heating. To this end, two or more light beams are produced, focused on the carrier, and scanned along the recording layer of the information carrier so that portions of this recording layer are heated differently. This is achieved by changing the density of the beam by changing the density of the beam by changing the radiation intensity or the size of the spot.

This method is deficient in that it cannot provide multiple use of the optical information carrier due to the reasons listed above.

SUMMARY OF THE INVENTION

The invention is to provide a method of erasing information, which permits multiple repeated recordings of information on the same optical information carrier after information has been erased from this carrier.

This is achieved by a method of erasing information recorded on an optical information carrier having a recording layer. According to the invention, the optical information carrier is equipped with an air-tight space and provided with a recording layer on the internal surface of said space, is filled with gas inert in relation to the material of the recording layer and to the material of the optical information carrier, said gas being under a pressure selected from a range from 10 kPa to $10^3$ kPa. The optical information carrier is heated, and, after the heating is over, the recording layer is regenerated.

This method of erasing information permits multiple use of the same optical information carrier and makes this optical carrier more mechanically strong.

An additional amount of material for the recording layer may be placed into the air-tight closed space of the optical information carrier in order to maintain a permanent thickness of the recording layer in the process of rewriting information, when the air-tight space is made as a cylinder and the recording layer is provided on the lateral surface thereof.

BRIEF DESCRIPTION OF THE DRAWING

The invention will now be described in more detail with reference to the accompanying drawing wherein an optical information carrier is shown as an embodiment realizing the method for erasing information, according to the invention.

DESCRIPTION OF THE PREFERRED EMBODIMENT

The method for erasing information recorded on an optical information carrier can be realized by the use of a specially designed carrier one embodiment of which is illustrated in the drawing.

An optical information carrier comprises a base which in this embodiment is a cylinder 1 made of a material transparent to laser-emitted light (the laser is not shown in the accompanying drawing), e.g. of glass. But, it should be pointed out that the claimed method can be realized by an optical information carrier equipped with a base made, for example, of two coaxial disks, or any other similar construction.

The cylinder 1 is hollow and a recording layer 2 is provided on the internal lateral surface thereof as a thin film of, for example, Te or Bi. Sealing bushings 3 and 4 are installed in the butt ends of the cylinder 1 to confine an airtight space 5 inside the cylinder 1, the recording layer 2 being inside said air-tight space 5. A tube 6 is fitted into the bushing 3 for evacuation of air from the space 5 and for further pumping of gas which is inert in relation to the material of the recording layer 2 and to the material of the cylinder 1, that is to tellurium, bismuth, and glass at the same time. This may be nitrogen or argon.

The pressure of gas inside the air-tight space 5 may range from 10 to $10^3$ kPa. If the gas pressure is brought lower than 10 kPa, the speed of transfer of the material of the recording layer 2 from gaseous to liquid phase is too high and the thickness of the regenerated recording layer 2 becomes irregular. If the gas pressure is higher than $10^3$ kPa, the speed of regeneration of the recording layer 2 is slowed down and the efficiency of the process is affected.

Preferably, the gas pressure inside the air-tight space 5 should be kept closer to the atmospheric pressure.

It should be noted that, for the optical carrier designed as described above, both external and internal pressure may be excessive. It is for this reason that the cylindrical shape of the carrier is advantageous since with minimal wall thickness of the carrier base it can best withstand the excess pressure from any direction. Gas pumped into the air-tight space 5 can bring the excess pressure to an acceptable level. The optical information carrier having this design is mechanically very strong.

An electrically conducting layer 7 is also provided on the external surface of the cylinder 1. This conducting layer 7 should be transparent for the laser-emitted light and electrically connected to an axial support 8. An electrode 9 is installed in the air-tight space 5 and electrically connected to a cover 10 made from an electrically conducting material.

Information is recorded on this optical carrier by any known method by a focused beam whose intensity, or shape, or area or any other parameter is modulated by the signal to be recorded. The optical information carrier is set into rotation by any known drive (not shown) about its geometrical axis. Recording of information results from certain changes in the relief of the surface of the recording layer 2.

Recorded information can, therefore, be erased by the following method.

The optical information carrier is exposed to some external action, e.g. it is heated by any known method. The material of the recording layer 2 evaporates almost completely. Heating is then discontinued and the recording layer 2 is regenerated by cooling the optical carrier. The material of the recording layer 2 available in a gaseous state within the air-tight space 5 of the optical carrier is deposited on the cool walls of the optical carrier as a liquid at first and as a solid matter finally. Since the air-tight space 5 of the optical carrier contains gas inert in relation to the material of the cylinder and the recording layer 2, the process is substantially slowed down. The uniformity of the regenerated recording layer 2 is achieved by this slowed down process, whereby practically no drops are formed on the inside surface of the cylinder, even though the materials of the recording layer 2 are characterized by a high surface energy. The uniform regenerated recording layer 2 ensures high quality of repeated recordings. The number of rewrite cycles in the proposed method and device realizing this method is also achieved by using low-power laser emission for recording information because in this case a high surface energy material can be used as the recording layer 2, which substantially reduces its destruction.

To control the regeneration rate of the recording layer 2 after heating is stopped, the optical information carrier is exposed to an electrical field. To this end, a potential difference is applied to the electrode 9 and to to conducting layer 7. This potential difference reduces the rate of ion deposition in the regenerated layer 2. The degree of ionization of vapour of the material of the recording layer 2 can be intensified by additional exposure to radiation of the cylinder 1 or some other method, in case natural factors are insufficient. This means that only a negligible part of the material of the recording layer 2 is in a liquid phase at any stage of the process due to the correct selection of the slow-down potential applied to the optical carrier and availability of gas within the air-tight space 5, which cut down the free run of particles of the material of the recording layer 2 and drastically reduce the rate of deposition of the recording layer 2 on the internal surface of the cylinder 1.

Some additional amount of the material of the recording layer 2 may be placed into the air-tight space 5 of the optical information carrier in order to maintain the thickness of the recording layer 2 constant even with frequent and multiple rewrite cycles, when some material may be deposited on the butt end walls of the space 5. This can, for example, be done by applying a layer 11 of the same material on the butt end walls of the space 5.

The herein disclosed method for erasing information offers the advantage of a substantial increase in the number of rewrite cycles and, simultaneously, more reliability for the processes of information recording and readout. This is due to the fact that the recording layer located inside an airtight space of the optical information carrier cannot be damaged or contaminated. The use of a cylindrically shaped optical information carrier also contributes to the reliability of information storage and processing due to its considerable mechanical strength.

This invention can be used in computers, in video and sound recording devices, in information storage and processing systems, and, in particular, in external memories of computers.

We claim:

1. A method for erasing information recorded on an optical information carrier having a recording layer (2) comprising the steps of exposing the optical information carrier to external action by heating said optical carrier, the optical information carrier being provided with an air-tight internal space (5) having a recording layer (2) applied to the inner surface thereof; filling said air-tight space (5) with gas inert in relation to the material of the recording layer (2) and to the material of the optical information carrier under a pressure selected from a range from 10 to $10^3$ kPa; and, after the heating process is discontinued, regenerating the recording layer (2).

2. A method as claimed in claim 1, wherein the optical information carrier (5) is made as a cylinder wherein the recording layer (2) is applied on the lateral surface thereof, an additional amount of the material being used for the recording medium is placed into the air-tight space (5) in order to maintain the thickness of the recording layer (2) at a constant level in the process of rewriting information.

* * * * *